United States Patent
Moushon et al.

[11] Patent Number: 6,145,823
[45] Date of Patent: Nov. 14, 2000

[54] SOLDER CLAMP

[76] Inventors: Gaylan W. Moushon, 566 Ronda Ct., Calimesa, Calif. 92320; Robert W. Moushon, 1924 Rossie Lee, Bossier City, La. 71112

[21] Appl. No.: 09/287,146

[22] Filed: Mar. 11, 1999

Related U.S. Application Data

[60] Provisional application No. 60/078,010, Mar. 12, 1998.

[51] Int. Cl.[7] ........................................... B25B 1/00
[52] U.S. Cl. ........................... 269/254 R; 269/254 CS; 269/3; 269/6
[58] Field of Search ............................. 269/6, 3, 254 CS, 269/254 R

[56] References Cited

U.S. PATENT DOCUMENTS

| | | | |
|---|---|---|---|
| 2,311,433 | 2/1943 | Dershem | 269/254 R |
| 3,218,058 | 11/1965 | Smith | 269/254 R |
| 4,479,639 | 10/1984 | Kane | 269/6 |

*Primary Examiner*—David A. Scherbel
*Assistant Examiner*—Lee Wilson
*Attorney, Agent, or Firm*—Steven J. Adamson

[57] ABSTRACT

A solder clamp having a common base and first and second clamp levers or jaws that are capable of independent operation. Positioning slots are preferably provided in the common base and the first and second clamp levers to properly align two wires or similar articles to be joined. The common base and clamp levers are formed of a durable plastic or similar lightweight, durable and inexpensive material. Torsion, coil or flat springs or similar mechanisms are provided to bias the first and second clamp lever towards the common base.

16 Claims, 1 Drawing Sheet

SOLDER CLAMP

CROSS REFERENCE TO RELATED APPLICATIONS

This application claims the benefit of U.S. Provisional Application No. 60/078,010, filed Mar. 12, 1998, and having the same title and inventors as above.

FIELD OF THE INVENTION

The present invention relates to clamps for holding two pieces of metal that are to be soldered or otherwise joined.

BACKGROUND OF THE INVENTION

The prior art contains many devices for holding and/or positioning two pieces of metal that are to be joined. Most of these are relatively heavy duty devices for use in welding or other fields such as plumbing, etc. While beneficial in some respects, these devices tend to be disadvantageous in that they are bulky, complicated or time consuming to use, relatively expensive to manufacture, have many moving parts and may require frequent adjustments to work properly, amongst other considerations.

A need exists for a clamp that is better suited to soldering and other applications that do not require or permit the use of "heavy duty" equipment.

SUMMARY OF THE INVENTION

Accordingly, it is an object of the present invention to provide a clamp for use in soldering and like activities that is lightweight and easy to use.

It is another object of the present invention to provide such a clamp that automatically positions two pieces of metal (e.g., two wires) in proper alignment for joining.

It is also an object of the present invention to provide such a clamp that is relatively inexpensive to manufacture.

These and related objects of the present invention are achieved by use of a solder clamp as described herein.

In one embodiment, the clamp of the present invention includes a common base and first and second clamp levers or jaws that are capable of independent operation. Positioning slots are provided in aligned regions of the common base and opposing first and second clamp levers for receiving and properly positioning two wires or similar articles. The common base and clamp levers are preferably formed of a durable plastic or similar durable, lightweight and inexpensive material. Torsion, coil or flat springs or similar mechanisms are preferably provided to bias the first and second clamp lever towards the common base.

The attainment of the foregoing and related advantages and features of the invention should be more readily apparent to those skilled in the art, after review of the following more detailed description of the invention taken together with the drawings.

DETAILED DESCRIPTION

Figure 1:
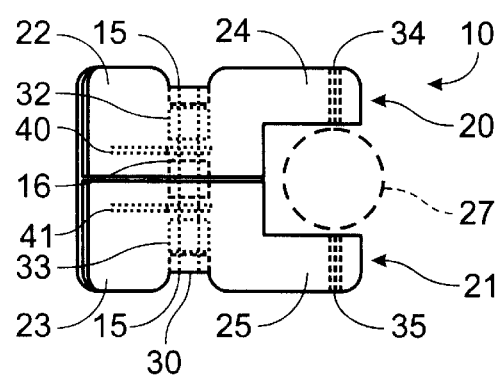
FIG. 1 is a plan view of a clamp in accordance with the present invention.

Referring to FIG. 1, a plan view of clamp 10 in accordance with the present invention is shown. Clamp 10 includes a base 12 (obscured in FIG. 1 and shown in more detail in FIG. 2), first and second independent clamp levers or jaws 20,21, a pivot pin 30 and springs 40,41 which respectively bias the first and second jaws towards the common base. Each jaw 20,21 is comprised of a handle region 22,23 and a finger region 24,25, respectively. The finger regions are preferably narrower than the handle regions and define a work space 27 therebetween in which the joining mechanism (soldering gun, tape, etc.) may be applied to wires held by clamp 10. Common base 10 has a similar configuration.

Figure 2:
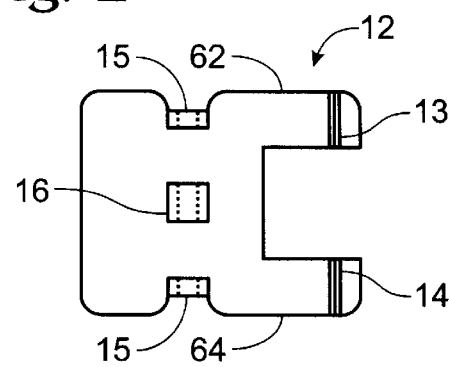
FIG. 2 is a plan view of a common base for the clamp of FIG. 1 in accordance with the present invention.

Referring to FIG. 2, a plan view of a common base with finger region 64,66 for clamp 10 in accordance with the present invention is shown. Base 12 includes first and second wire positioning grooves 13,14 (groove 14 is shown from the side in FIG. 3). Base 12 also includes two end protrusions 15 and a center protrusion 16. The end and center protrusions each preferably contain a central bore through which pin 30 is later inserted.

Referring again to FIG. 1, each jaw preferably has a center protrusion 32,33 that is arranged in a complementary manner with the end and center protrusions 15,16, generally as shown. Each of the jaw center protrusions 32,33 preferably has a center bore therethrough to accommodate pin 30. Torsion springs 40,41 are preferably positioned between the center protrusion of the jaws 30,31 and a center protrusion of common base 12 as shown. While springs 40,41 are preferably torsion springs, it should be recognized that other types of springs including flat springs and coil springs and other biasing mechanisms may be used.

The first jaw and the second jaw each include a wire positioning groove 34,35. Groove 34 is aligned with groove 13 at the common base, while groove 35 is aligned with groove 14 of the common base. The arrangement of the wire positioning grooves permits two wires to be securely held by the clamp with the ends to be joined appropriately positioned with respect to one another in work space 27.

The independent attachment of the first and second jaws permits an operator to securely position one wire and then position the second wire. This ability to separately secure wires is particularly valuable in situations where the wires are hard to reach such as under the dashboard of a car and like situations.

Figure 3:
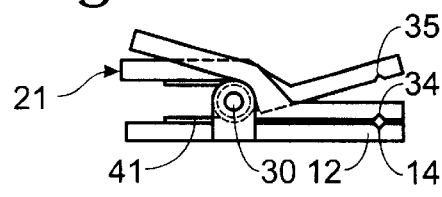
FIG. 3 is a side view of the clamp of FIG. 1 with one jaw in the open position in accordance with the present invention.

Referring to FIG. 3, a side view of clamp 10 with second jaw 21 in the open position is shown in accordance with the present invention. The perspective of FIG. 3 illustrates the alignment of the wire positioning grooves (groove 13 is obscured by the edge of groove 14). FIG. 3 also illustrates independent operation of the jaws and various componentry such as spring 41, pin 30, common base 12, etc.

Figure 4:
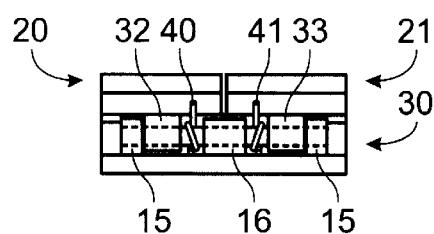
FIG. 4 is an end view of the clamp of FIG. 1 in accordance with the present invention.

Referring to FIG. 4, an end view of clamp 10 in accordance with the present invention is shown. FIG. 4 illustrates the complementary position of the protrusions of the jaws and common base (15,16,32,33). FIG. 4 also illustrates the relative positioning of springs 40,41, pin 30, jaws 20,21 and common base 12.

Figure 5:
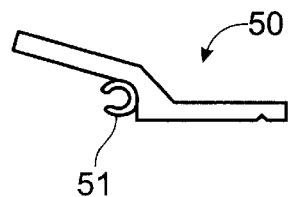
FIG. 5 is a side view of an alternative jaw arrangement in accordance with the present invention.

Referring to FIG. 5, a side view of an alternative jaw arrangement in accordance with the present invention is shown. Jaw 50 is essentially the same as jaw 40 or 41 except that it includes one or more C-shaped members 51. C-shaped member 51 is preferably formed integrally with the jaw and is configured of appropriate dimensions to snap onto pin 30. The provision of a snap-on-jaw eliminates the need for protrusions 32,33 with bore holes therethrough and may accelerate the assembly process. It is also contemplated to form pin 30 integrally with common base 12. If pin 30 is formed integrally with the base and snap-on-jaws are utilized, then the number of individual components is reduced, resulting in simpler assembly.

Figure 6:
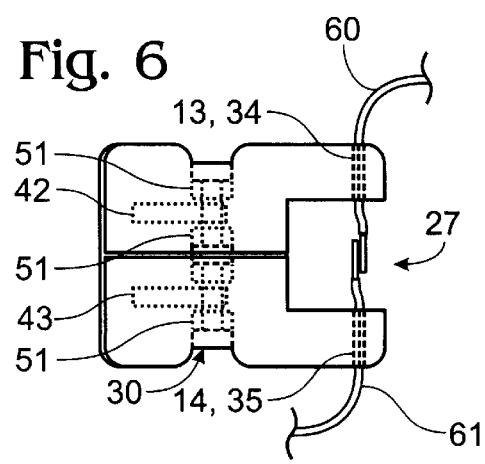
FIG. 6 is a plan view of the clamp of FIG. 1 having two wires to be joined therein in accordance with the present invention.

Referring to FIG. 6, a plan view of clamp 10 having two wires to be joined therein is shown in accordance with the present invention. Wires 60,61 are placed in positioning grooves 13,14,34,35 and securely held such that their ends are adjacent one another in work space 27. FIG. 6 also illustrates the use of flat springs 42,43 and jaws with C-shaped members 51. Pin 30 may be either formed integrally with the common base or provided as a separate component.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A clamp apparatus, comprising:
  a common base, said common base having a first base finger region and a second base finger region;
  a first clamp member that is movably coupled to said common base and includes a first clamp finger region and a first clamp handle region, said first clamp member being movable between an open position and a closed position in which said first clamp finger region contacts said first base finger region; and
  a second clamp member that is movably coupled to said common base and includes a second clamp finger region and a second clamp handle region, said second clamp member being movable between an open position and a closed position in which said second clamp finger region contacts said second base finger region;
  a first bias mechanism coupled to said first clamp member that biases said first clamp finger region towards said first base finger region; and
  a second bias mechanism coupled to said second clamp member that biases said second clamp finger region towards said second base finger region;
  wherein said first clamp member and said second clamp member are independently movable.

2. The apparatus of claim 1, wherein said common base has a substantially planar configuration.

3. The apparatus of claim 1, wherein said common base is configured so as to define an open work space between said first and said second base finger regions.

4. The apparatus of claim 1, wherein said first and second clamp members are pivotally coupled to said common base.

5. The apparatus of claim 4, wherein said pivotal coupling is by a pivotal connection of each of said first and second clamp members to said common base, each of said first and second clamp members including a pivot connection region located between the respective handle and finger regions.

6. The apparatus of claim 1, wherein said bias mechanism includes one of the group of bias mechanisms including a torsion spring, a coil spring and a flat spring.

7. The apparatus of claim 1, wherein said first clamp handle region is wider than said first clamp finger region.

8. The apparatus of claim 1, wherein said first and second finger regions are spaced from one another about the workspace defined by said common base and said first clamp finger region is aligned with said first base finger region and said second clamp finger region is aligned with said second base finger region.

9. The apparatus of claim 1, wherein at least one of said first clamp finger region and said first base finger region includes a wire accommodating recess and at least one of said second clamp finger region and said second base finger region includes a wire accommodating recess.

10. The apparatus of claim 1, wherein said first clamp member and said second clamp member are located sufficiently close to one another on said common base that they can be operated by one human hand.

11. A solder clamp apparatus, comprising:
  a common base having a first base finger region and a second base finger region and being configured so as to define an open work space between said first and said second base finger regions;
  a first clamp member that is pivotally coupled to said common base and includes a first clamp finger region and a first clamp handle region, said first clamp member being movable between an open position and a closed position in which said first clamp finger region contacts said first base finger region;
  a second clamp member that is pivotally coupled to said common base and includes a second clamp finger region and a second clamp handle region, said second clamp member being movable between an open position and a closed position in which said second clamp finger region contacts said second base finger region;
  a first bias mechanism coupled to said first clamp member that biases said first clamp finger region towards said first base finger region; and
  a second bias mechanism coupled to said second clamp member that biases said second clamp finger region towards said second base finger region;
  wherein said first and second clamp members are independently movable.

12. The apparatus of claim 11, wherein said common base has a substantially planar configuration.

13. The apparatus of claim 11, wherein said bias mechanism includes one of the group of bias mechanisms including a torsion spring, a coil spring and a flat spring.

14. The apparatus of claim 11, wherein said first clamp handle region is wider than said first clamp finger region.

15. The apparatus of claim 11, wherein said first and second finger regions are spaced from one another about the workspace defined by said common base and said first clamp finger region is aligned with said first base finger region and said second clamp finger region is aligned with said second base finger region.

16. The apparatus of claim 11, wherein said first clamp member and said second clamp member are located sufficiently close to one another on said common base that they can be operated by one human hand.

* * * * *